(12) United States Patent
Nishihara

(10) Patent No.: US 11,338,457 B2
(45) Date of Patent: May 24, 2022

(54) KNIFE

(71) Applicant: KYOCERA CORPORATION, Kyoto (JP)

(72) Inventor: Takanori Nishihara, Takatsuki (JP)

(73) Assignee: KYOCERA Corporation, Kyoto (JP)

(*) Notice: Subject to any disclaimer, the term of this patent is extended or adjusted under 35 U.S.C. 154(b) by 0 days.

(21) Appl. No.: 16/473,627

(22) PCT Filed: Dec. 26, 2017

(86) PCT No.: PCT/JP2017/046770
§ 371 (c)(1),
(2) Date: Jun. 26, 2019

(87) PCT Pub. No.: WO2018/124127
PCT Pub. Date: Jul. 5, 2018

(65) Prior Publication Data
US 2019/0321992 A1    Oct. 24, 2019

(30) Foreign Application Priority Data
Dec. 26, 2016  (JP) .............................. JP2016-250530

(51) Int. Cl.
*B26B 9/00*      (2006.01)
*C01G 25/02*     (2006.01)
*B26B 3/00*      (2006.01)

(52) U.S. Cl.
CPC ............... *B26B 9/00* (2013.01); *C01G 25/02* (2013.01); *B26B 3/00* (2013.01); *C01P 2002/74* (2013.01); *C01P 2002/76* (2013.01); *C01P 2004/01* (2013.01)

(58) Field of Classification Search
None
See application file for complete search history.

(56) References Cited

U.S. PATENT DOCUMENTS

| | | | | |
|---|---|---|---|---|
| 3,585,390 A | * | 6/1971 | Ishikawa .............. | H05B 3/0076 250/503.1 |
| 5,256,496 A | * | 10/1993 | Kluczynski .............. | B26B 9/00 30/350 |
| 5,724,868 A | * | 3/1998 | Knudsen et al. ...... | A45D 29/00 76/104.1 |

(Continued)

FOREIGN PATENT DOCUMENTS

| CN | 201201249 Y | 3/2009 |
|---|---|---|
| CN | 103035257 A | 4/2013 |

(Continued)

*Primary Examiner* — Clark F Dexter
(74) *Attorney, Agent, or Firm* — Viering, Jentschura & Partner mbB

(57) ABSTRACT

A knife includes a blade having a first side face and a second side face. The blade includes zirconia as a main component, and includes a cutting region including at least a ridge portion between the first side face and the second side face. When a portion including the cutting region in the first side face is referred to as a first cutting face, and a portion including the cutting region in the second side face is referred to as a second cutting face, the proportion of cubic crystals of zirconia in the first cutting face is larger than the proportion of cubic crystals of zirconia in the second cutting face.

4 Claims, 7 Drawing Sheets

(56) References Cited

U.S. PATENT DOCUMENTS

| | | | | |
|---|---|---|---|---|
| 6,067,784 | A * | 5/2000 | Jordan | B23D 35/001 30/345 |
| 6,431,800 | B1 * | 8/2002 | Suzuki | C04B 35/486 264/642 |
| 9,919,971 | B2 * | 3/2018 | Nagayama et al. | C04B 35/638 |
| 2003/0145525 | A1 * | 8/2003 | Rosenflanz | C04B 35/50 501/48 |
| 2004/0163262 | A1 * | 8/2004 | King et al. | B26B 21/58 30/346.53 |
| 2006/0010696 | A1 * | 1/2006 | Critelli | C23C 30/005 30/506 |
| 2006/0207110 | A1 * | 9/2006 | Nishigaki et al. | B26B 9/02 30/350 |
| 2006/0268528 | A1 * | 11/2006 | Zadesky et al. | H04M 1/0202 361/728 |
| 2008/0016704 | A1 * | 1/2008 | Haneda | B26B 9/02 30/357 |
| 2008/0118722 | A1 * | 5/2008 | Shikata et al. | C04B 35/64 428/212 |
| 2008/0155839 | A1 * | 7/2008 | Anderson | B25G 1/10 30/350 |
| 2009/0217537 | A1 * | 9/2009 | Macdonald et al. | B26B 23/00 30/350 |
| 2010/0037456 | A1 * | 2/2010 | Hamashima | H05K 13/0409 29/739 |
| 2010/0263218 | A1 * | 10/2010 | Bookhamer | B26B 29/02 30/298.4 |
| 2011/0010950 | A1 * | 1/2011 | Madeira et al. | C23C 16/01 30/346.54 |
| 2011/0232108 | A1 * | 9/2011 | Ochiai et al. | C23C 26/00 30/345 |
| 2012/0317822 | A1 * | 12/2012 | Ochiai et al. | B26B 9/00 30/350 |
| 2013/0083425 | A1 | 4/2013 | Tamaki et al. | |

FOREIGN PATENT DOCUMENTS

| | | | |
|---|---|---|---|
| EP | 2 266 934 | * | 12/2010 |
| JP | 6-32668 | * | 2/1994 |
| JP | H09110561 A | | 4/1997 |
| JP | 2004089620 A | | 3/2004 |
| JP | 2005-206392 | * | 8/2005 |
| JP | 2012-120856 | * | 6/2012 |
| JP | 2012201884 A | | 10/2012 |
| JP | 2013084337 A | | 5/2013 |
| JP | 2013-111720 | * | 6/2013 |
| KR | 10-2009-0066613 | * | 6/2009 |

* cited by examiner

KNIFE

CROSS-REFERENCE TO RELATED APPLICATIONS

This application is a national stage entry according to 35 U.S.C. 371 of PCT Application No. PCT/JP2017/046770 filed on Dec. 26, 2017, which claims priority to Japanese Application No. 2016-250530 filed on Dec. 26, 2016, which are entirely incorporated herein by reference.

TECHNICAL FIELD

The present disclosure relates to a knife.

BACKGROUND

Conventionally, a knife may have a blade, made of a ceramic, whose main component may be zirconia, as described in Patent Document 1 (Patent Document 1: Japanese Unexamined Patent Publication No. 2004-89620 A), for example, may be used. For the knife with a blade, made of ceramics, whose main component is zirconia, there may be no occurrence of rust and the like, which is a problem with a knife with a metal blade, and in addition, since the hardness is high, there may be an advantage that the sharpness lasts longer.

SUMMARY

A non-limiting aspect of the present disclosure is a knife that may include a blade having a first side face and a second side face. The blade may include zirconia as a main component, and include a cutting region including at least a ridge portion between the first side face and the second side face. When a portion including the cutting region in the first side face is referred to as a first cutting face, and a portion including the cutting region in the second side face is referred to as a second cutting face, the proportion of cubic crystals of zirconia in the first cutting face may be larger than the proportion of cubic crystals of zirconia in the second cutting face.

DETAILED DESCRIPTION

Figure 1:
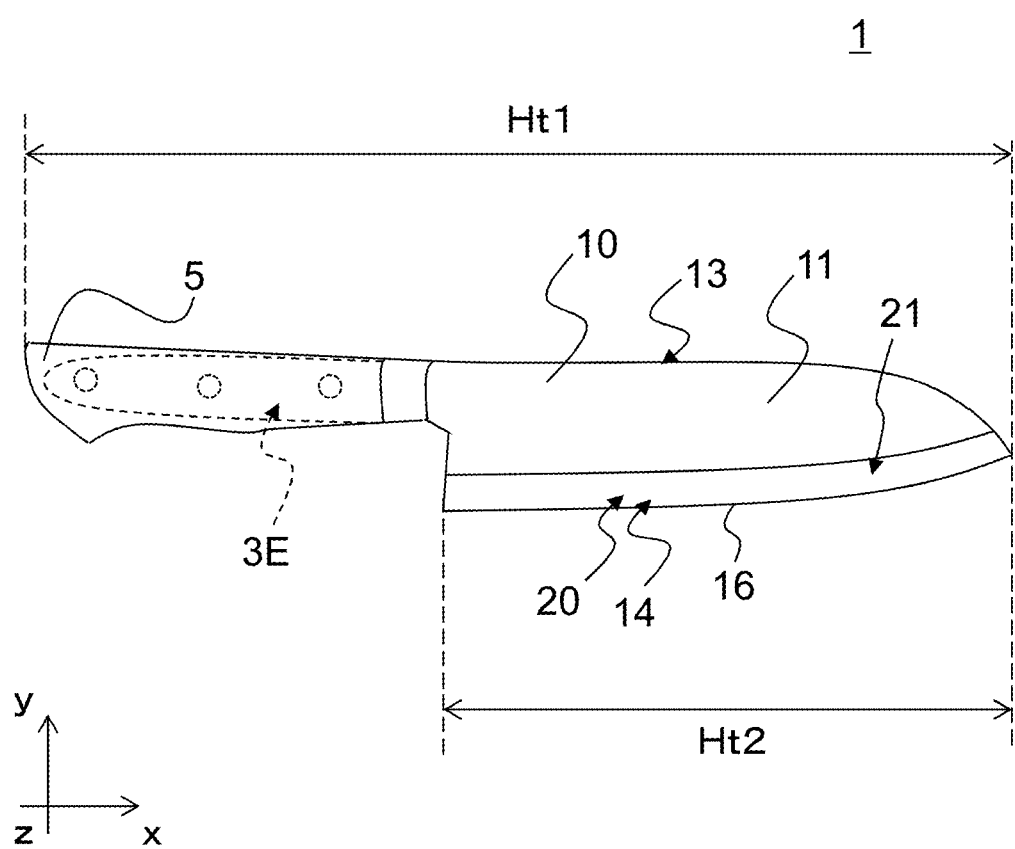
FIG. 1 is a side view of a non-limiting embodiment of a knife of the present disclosure.

Hereinafter, a knife according to a non-limiting embodiment of the present disclosure will be described with reference to the drawings. The drawings used in the following description are schematic, and dimensional ratios and the like in the drawings do not necessarily coincide with actual ones.

Knife

Figure 2:
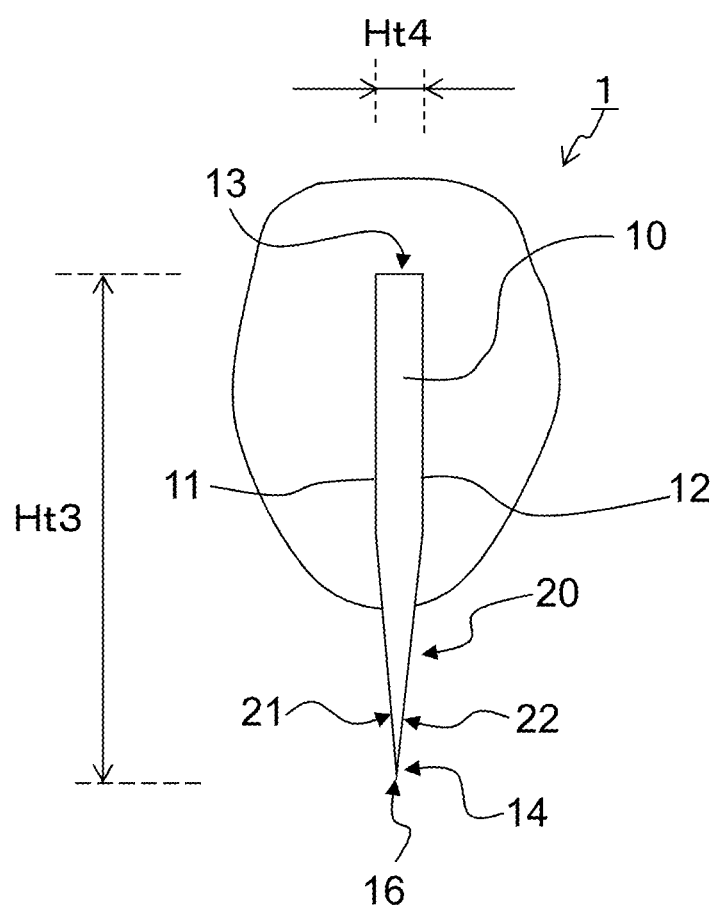
FIG. 2 is a front view of the knife shown in FIG. 1.
Figure 3:
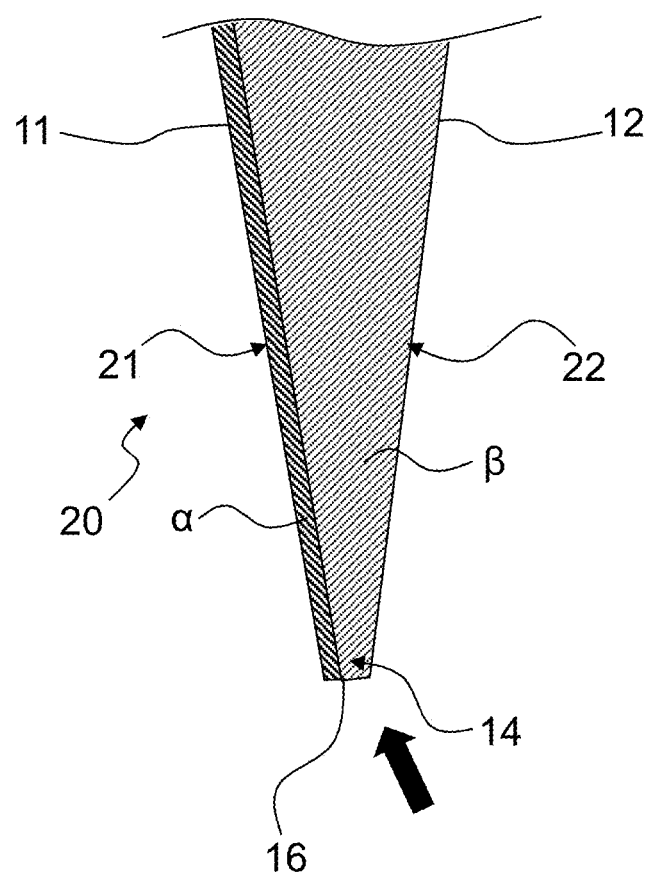
FIG. 3 is an enlarged sectional view of part of the knife shown in FIG. 2.
Figure 3:
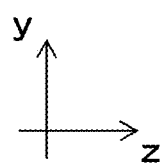

Hereinafter, a knife according to a non-limiting embodiment of the present disclosure will be described with reference to the drawings. As shown in FIGS. 1 to 3, a knife 1 of the present non-limiting embodiment includes a blade 10 having a first side face 11 and a second side face 12. The blade 10 includes a cutting region 20 containing zirconia as a main component, and including at least a ridge portion 14 between the first side face 11 and the second side face 12. When a portion including the cutting region 20 in the first side face 11 is referred to as a first cutting face 21, and a portion including the cutting region 20 in the second side face 12 is referred to as a second cutting face 22, the proportion of cubic crystals of zirconia in the first cutting face 21 is larger than the proportion of cubic crystals of zirconia in the second cutting face 22.

The blade 10 includes a so-called cutting edge (a cutting edge 16) corresponding to a ridge between the first side face 11 and the second side face 12, and as shown in FIG. 1, has a back portion 13 (a back side peak, a back side ridge) that is opposite the cutting edge 16. The blade 10 includes a region in which the thickness gradually decreases from the back portion 13 toward the cutting edge 16. In the present non-limiting embodiment, the region where the thickness gradually decreases is the cutting region 20. The ridge portion 14 refers to a region up to a distance of 5 mm from the cutting edge 16 toward the back portion 13.

The material (components and content) of the blade 10 can be confirmed as follows. First, the components contained in the blade 10 are confirmed as follows. That is, the components are subjected to measurement using an X-ray diffractometer (XRD: for example, D8 ADVANCE manufactured by Bruker AXS GmbH.) and identified from the obtained value of 2θ (2θ is a diffraction angle) using the JCPDS card. Next, quantitative analysis of metal components contained in the blade 10 is performed using an ICP emission spectrometer (ICP). Then, the content of the metal component measured by ICP is converted to a component identified by XRD. For example, if the component identified by XRD is zirconia, the content of zirconium (Zr) obtained by ICP may be converted to zirconia ($ZrO_2$). In this description, zirconia is regarded as the main component when the content of zirconia is larger than 50 mass % among 100 mass % of all the components which constitute the blade 10. From the viewpoint of crack resistance and excellent sharpness, the content of zirconia may be 75 mass % or more.

The identity of the component can be estimated by observing the blade 10 with a scanning electron microscope (SEM), and using an energy dispersive X-ray spectrometer (EDS) attached to the SEM. Specifically, when zirconium and oxygen (O) are detected in the EDS measurement of a plurality of particles observed by the SEM, the component can be estimated to be zirconia. When particles with almost the same color tone are mainly confirmed on the SEM image, and zirconium and oxygen are detected in 11 out of 20 in these particles, the target blade 10 can be considered to include zirconia as the main component.

In the crystal structure of zirconia, a cubic crystal has a larger volume per unit mass than a tetragonal crystal. The first cutting face 21 having a proportion of cubic crystals larger than that of the second cutting face 22 has a compressive strength higher than that of the second cutting face 22, and has a hardness relatively higher than that of the second cutting face 22. That is, in the knife 1, the blade 10 has the first side face 11 having a relatively high hardness portion (hereinafter referred to as a first portion α) and the second side face 12 having a relatively low hardness portion (hereinafter referred to as a second portion β).

The second portion β, which has relatively low hardness, has relatively high toughness, and easily absorbs an external force or an impact by deformation. On the other hand, the first portion α having a relatively high hardness is relatively great in an action to cut into a hard object (so-called sharpness).

The cutting region 20 whose thickness is gradually reduced greatly contributes to the cutting action in the cutting operation by the knife 1. Since the knife 1 has the first portion α including the first cutting face 21 with a relatively high hardness on the first cutting face 21, the cutting action is strong (so-called sharp cutting). Further, since the knife 1 has the portion β with a relatively low hardness on the second cutting face 22, the occurrence of cracking, chipping, and the like is suppressed. The knife 1 is relatively great in the action of cutting into a hard object (a so-called sharpness), and is less likely to crack or chip when it receives an impact or the like.

In the knife 1 of the present disclosure, the proportion of cubic crystals in the entire first side face 11 is larger than that in the second side face 12, but the present disclosure is not limited to this embodiment. For example, the region where the proportion of cubic crystals is larger than that in the second side face 12 may be only the first cutting face 21 of the first side face 11, and the range of the region is not particularly limited.

In the knife 1, the proportion of cubic crystals of zirconia in the first side face 11 may be larger than the proportion of cubic crystals of zirconia in the second side face 12. Here, the term "in the first side face 11" means the whole of the first side face 11 in the range from the back portion 13 to the cutting edge 16. Further, the term "in the second side face 12" means the whole of the second side face 12 in the range from the back portion 13 to the cutting edge 16.

The knife 1 satisfying the above configuration has a relatively high hardness as a whole on the first side face 11, so that a relatively high sharpness is maintained for a long period of time, and a scratch or the like hardly occurs even when the face is brought into contact with other members. A scratch or the like on the side face of the blade 10 leads to degradation in the smoothness when cutting the object, but with the knife 1 having a relatively hard first side face 11 as a whole, the smooth sharpness is maintained over a relatively long period.

FIG. 3 shows an example of the above non-limiting embodiment in a cross-sectional view. With the knife 1 satisfying the above-described configuration, in the first side face 11 including the first cutting face 21, the first portion α with a relatively high hardness is positioned in a layer. Also, an example is shown in which the second side face 12 and the portion other than the first portion α is the second portion β having a relatively low hardness. In other words, the blade 10 includes the knife-shaped second portion β and the layered first portion α located on the face opposite to the second side face 12. In the knife 1 of the present non-limiting embodiment, the knife-shaped second portion β that easily absorbs an external force and an impact occupies a large volume portion, so that it is easier to absorb an external force and an impact. On the other hand, since the first portion α having a relatively high hardness is located in a layered manner, a sufficiently high sharpness can be obtained by the thin first cutting face 21.

As described above, the fact that the proportion of cubic crystals of zirconia in the first side face 11 may be larger than the proportion of cubic crystals of zirconia in the second side face 12 is, in other words, that the knife 1 may include the first portion α on the entire first side face 11, and the second portion β on the entire second side face 12.

In the knife 1 of the present non-limiting embodiment shown in FIG. 1, the overall length Ht1 can be set as appropriate, for example, can be set to 5 cm or more and 40 cm or less. The length (the length of the portion with the cutting edge) Ht2 of the blade 10 may be appropriately set according to the application, but may be set to, for example, 5 cm or more and 20 cm or less. The blade 10 is set to have a shape and a size according to various uses of the knife 1. Specific examples of the shape of the blade 10 include, for example, Japanese kitchen knives such as a broad-bladed kitchen knife and a santoku kitchen knife, western kitchen knives such as a butcher kitchen knife, and Chinese kitchen knives. In addition, the blade 10 does not need to be limited to have the shape of a kitchen knife, but, for example, may have a shape of other kinds of knives or surgical instruments.

Further, the width Ht3 (see FIG. 2) of the blade 10 in the direction orthogonal to the overall length Ht1 of the knife 1 can be appropriately set according to the application of the knife 1. For example, it can be set to 10 mm or more and 150 mm or less. The thickness Ht4 (see FIG. 2) of the blade 10 is set to, for example, 1 mm or more and 5 mm or less at the portion with the largest thickness. Further, the width of the cutting edge 16 is set to 2 µm or more and 15 µm or less. The thickness of the first portion α including the first side face 11 is about 1 µm or more and 10 µm or less over the entire first side face 11.

Moreover, in the knife 1 of the present disclosure, the first side face 11 may have a color generally recognized as black, and the second portion β may have a color generally recognized as white. The knife 1 has a black appearance on one side face and a white appearance on the other side face. Thus, the knife 1 of the present non-limiting embodiment has an appearance different from that of the conventional knife by providing the black first side face 11 and the white second side face 12.

As shown in FIG. 1, the knife 1 includes a handle 5 in addition to the blade 10. As shown in FIG. 1, the blade 10 is partially disposed inside the handle 5 as a core 3E. Examples of a material composing the handle 5 include wood, resin, ceramics, a metal material and the like. Examples of the resin include ABS resin (copolymer of acrylonitrile, butadiene and styrene), polypropylene resin and the like. The metal material may be a material that is resistant to rust, and examples thereof include titanium-based and stainless-based materials. The length of the handle 5 can be set as appropriate, and for example, may be configured in a shape that can be easily grasped by hand. Moreover, the thickness of the handle 5 can also be set appropriately. The thickness of the handle 5, including the core 3E, may be set to, for example, 5 mm or more and 3 cm or less.

Method of Manufacturing Knife

An example of the method of manufacturing the knife 1 of the present disclosure is described. First, a blade body made of ceramics is prepared. This blade body is a zirconia sintered body having substantially the same shape and size as those of the blade 10. For example, an acrylic, wax or PEG based binder is added to a zirconia powder containing 1 to 4 mol % of yttria powder so as to be present in an amount of 2 to 10 mass % to form granules. The obtained granules are molded using a mold at a molding pressure of 1000 to 1500 kg/cm² and then sintered to obtain a zirconia sintered body. The obtained zirconia sintered body is sharpened by a conventional method to obtain a blade body made of ceramics.

The above-mentioned molding method can be implemented by a method commonly performed by those skilled in the art other than the molding method using a mold. For example, casting, plastic molding (injection), rubber press, hot press, etc. can be used as appropriate. The sintering temperature may be appropriately set according to the material. Zirconia is sintered at 1300 to 1500 degrees C. After sintering, the obtained zirconia sintered body may be subjected to HIP treatment held at a pressure of 1500 to 2500 kg/cm² for 2 to 5 hours, if necessary.

Next, the zirconia sintered body (blade body) is irradiated with an electron beam. Specifically, the region corresponding to the first cutting face 21 of the blade body made of the zirconia sintered body is irradiated with an electron beam. In the present non-limiting embodiment, the side face of the blade body corresponding to the entire first side face 11 including the first cutting face 21 is irradiated with an electron beam. At this time, the side face opposite the blade body, that is, the side face corresponding to the second side face 12 is not irradiated with an electron beam.

The knife of the present disclosure can be obtained by altering zirconia by irradiation with the electron beam. The face irradiated with the electron beam is the first side face 11. The blade 10 having the first cutting face 21 obtained by irradiation with an electron beam and the second cutting face 22 not irradiated with the electron beam can be obtained by partially radiating the electron beam in this manner. Note that when the entire first side face 11 is irradiated with an electron beam, and no electron beam is radiated to the entire second side face 12, the proportion of cubic crystals of zirconia in the first side face 11 becomes larger than the proportion of cubic crystals of zirconia in the second side face 12.

After irradiation with the electron beam, the portion corresponding to the cutting region 20 may be polished. In this polishing, for example, a polishing plate may be placed only on the second cutting face 22 to selectively polish only the second cutting face 22.

The proportion of cubic crystals of zirconia to tetragonal crystals of zirconia in the first cutting face 21 obtained by the irradiation with the electron beam is higher than that of the second cutting face 22, and the hardness of the first cutting face 21 is higher than the hardness of the second cutting face 22. It is presumed that this is a result of the promotion of crystallization due to the increase in temperature of the portion irradiated with the electron beam by the irradiation with the electron beam.

Further, the first side face 11 obtained by the irradiation with the electron beam has a black appearance as a result of alteration of zirconia. A white zirconia sintered body (blade body) is prepared first as a zirconia sintered body, and one side face of this white zirconia sintered body is irradiated with an electron beam, so that it is possible to obtain the first side face 11 blackened by the irradiation with the electron beam. Further, while the first side face 11 irradiated with the electron beam is changed from white to black by the irradiation with the electron beam, the second side face 12 not irradiated with the electron beam is in a white state.

When a zirconia sintered body contains a coloring component, the color is not limited to the color tone mentioned above.

Properties such as surface roughness (Ra), surface height (Rz) and color tone of the first portion obtained by the irradiation with the electron beam are changed according to the irradiation energy, the irradiation angle and distance, the irradiation time, etc. at the time of the irradiation with the electron beam. It is possible to obtain the knife 1 which has a desired external appearance and sharpness by adjusting the irradiation condition of the electron beam, the conditions of polishing, etc.

The present disclosure is not limited to the non-limiting embodiments described above, and various changes, improvements, combinations, and the like can be made without departing from the scope of the present disclosure.

EXAMPLES

Appearance

Figure 4:
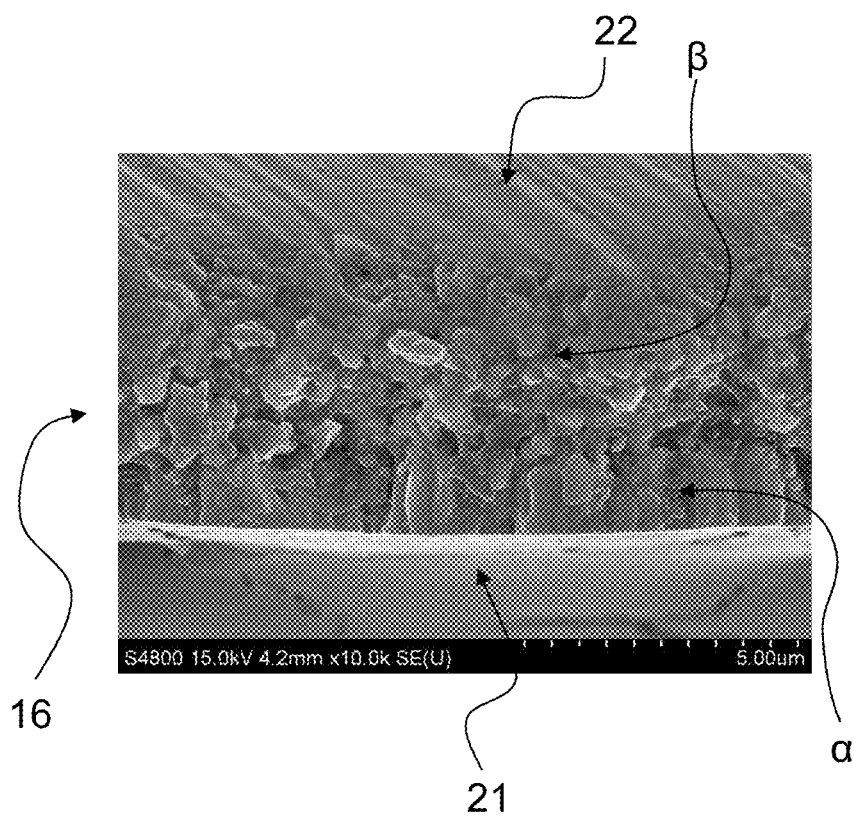
FIG. 4 is an electron micrograph image of a cutting edge of an example of a non-limiting embodiment of a knife of the present disclosure.

FIG. 4 shows an electron micrograph of the knife 1 manufactured by the manufacturing method of the non-limiting embodiment described above. FIG. 4 shows an electron micrograph obtained by observing the cutting edge 16 of the knife 1 with the direction of the arrow shown in FIG. 3 as the observation direction. The lower part of FIG. 4 is a region on the first cutting face 21 side obtained by radiating the electron beam with the electron gun, and the upper part of FIG. 4 corresponds to the second cutting face 22 made of a normal white zirconia sintered body which has not been irradiated with the electron beam. From the electron micrograph of FIG. 4, it can be seen that the granular crystal grains of the zirconia crystals are aggregated in the second portion β of the second cutting face 22, while the columnar crystal grains extending in a direction perpendicular to the first cutting face 21 are disposed in the first portion α of the first cutting face 21. It is presumed that crystal grains on the first cutting face 21 side are grown by the irradiation with the electron beam.

Crystal Structure

Figure 5:
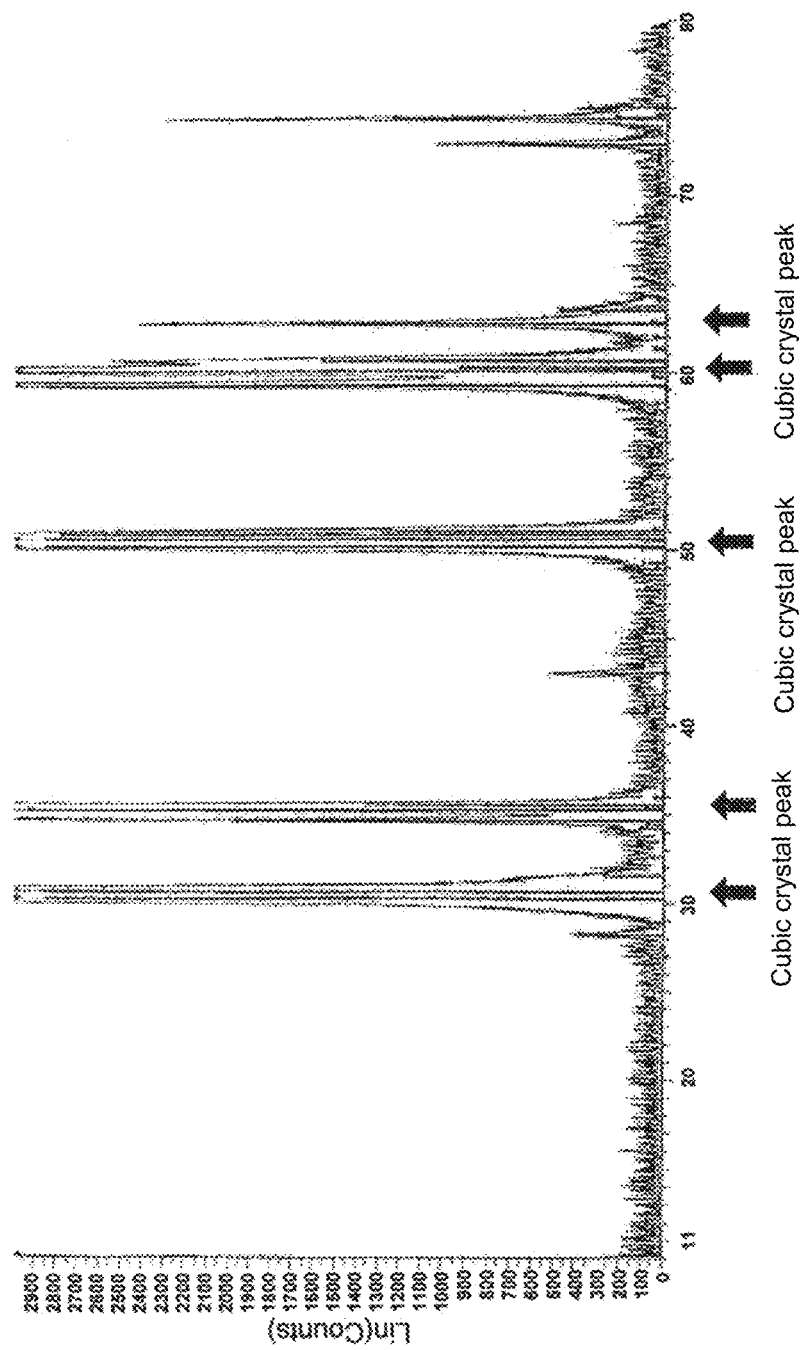
FIGS. 5(a) and 5(b) show an XRD pattern of the result of a measured crystal structure of a test body in which a zirconia sintered body is partially irradiated with an electron beam, where 5(a) shows the measurement result of the portion irradiated with the electron beam, and 5(b) shows the measurement result of the portion not irradiated with the electron beam.
Figure 5:
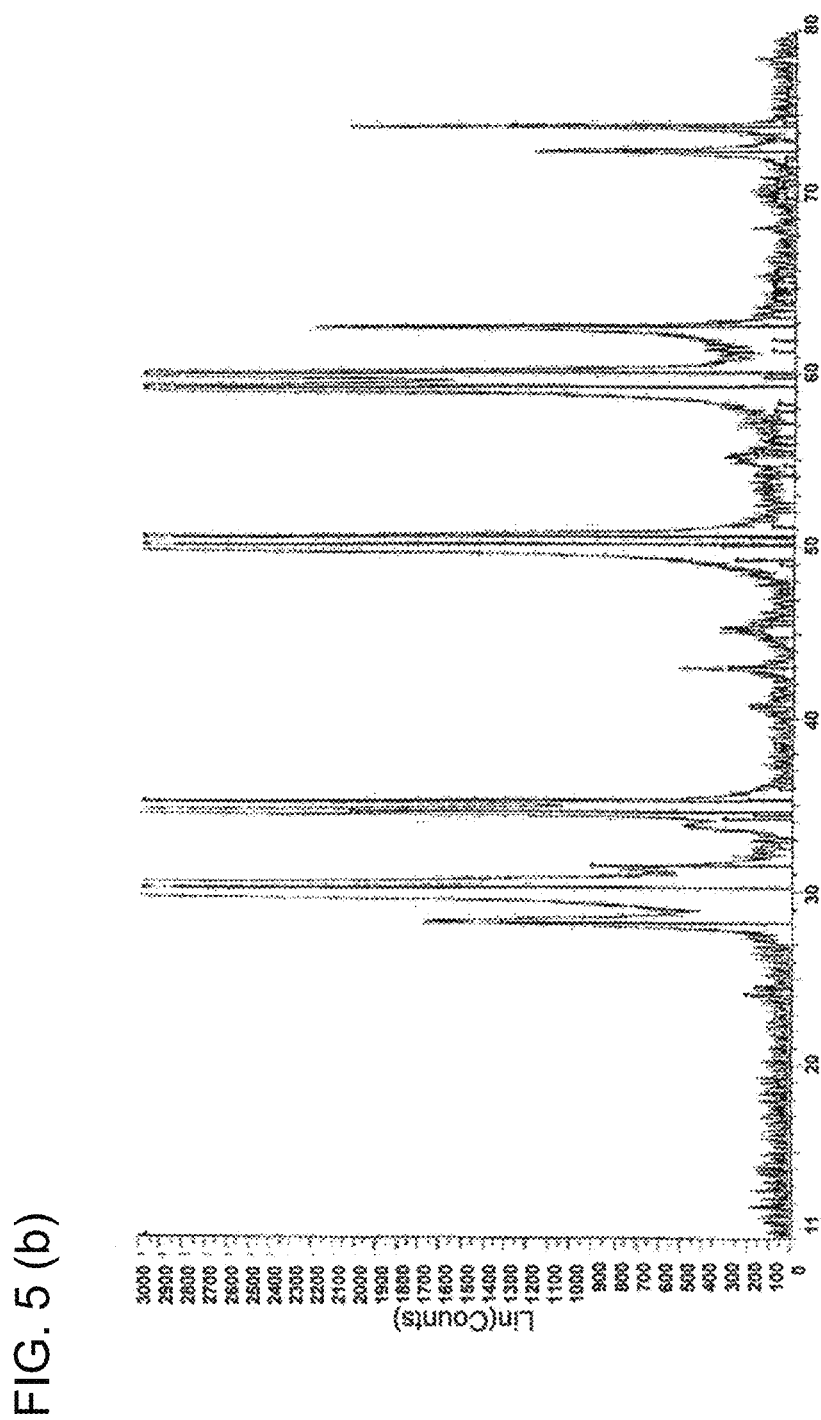

FIGS. 5(a) and 5(b) shows an XRD pattern of the result of a measured crystal structure of a test body in which a zirconia sintered body is partially irradiated with the electron beam, where 5(a) shows the measurement result of the portion irradiated with the electron beam, that is, the measurement result of the state corresponding to the first cutting face 21, and 5(b) shows the measurement result of the portion not irradiated with the electron beam, that is, the measurement result of the state corresponding to the second cutting face 22. The measurement was performed using an X'Pert PRO manufactured by PANalytical under the condition of 2θ=10° to 80° with CuKα rays. The X-ray diffraction pattern was analyzed using analysis software attached to this device to derive the crystal structure contained in each portion. It was found that although the peak of cubic crystal did not appear in FIG. 5(b) showing the second cutting face 22, the peak of cubic crystal appeared in FIG. 5(a) showing the first cutting face 21. It can be seen that cubic crystals are formed on the first cutting face 21 by the irradiation with the electron beam, and the first cutting face 21 contains more cubic crystals than those of the second cutting face 22.

Paper Cutting Test

Figure 6:
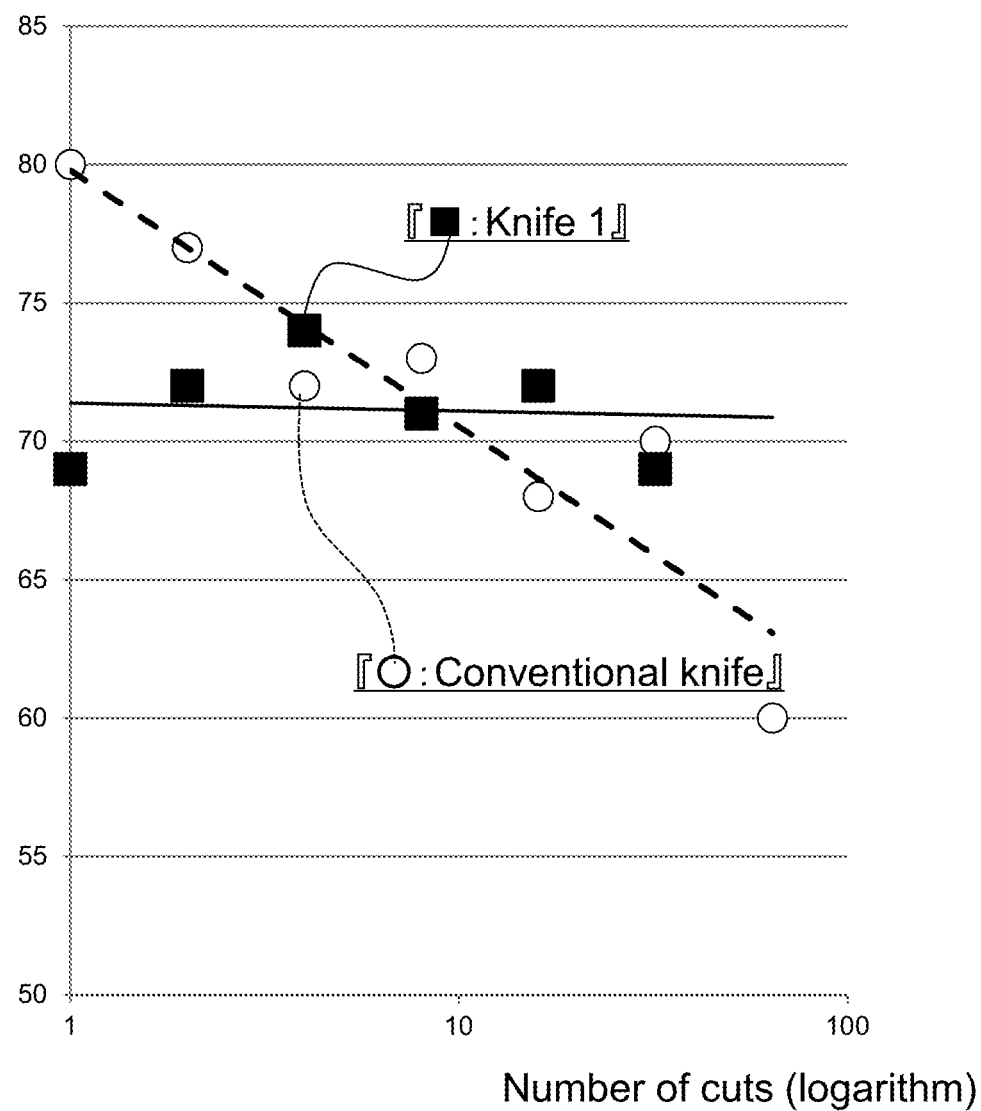
FIG. 6 shows a graph indicating the result of a paper cutting test performed on a non-limiting embodiment of a knife of the present disclosure.

FIG. 6 is a graph showing the results of the paper cutting test for the knife 1. The paper cutting test was performed using a Honda sharpness testing machine. The paper cutting test is to examine how many sheets can be cut when a bundle of 400 sheets is pressed at a predetermined pressure. The predetermined pressure may be set as appropriate. In this test, in addition to the sharpness of the knife 1, the sharpness of a conventional metal (stainless steel) knife as a comparative example was also evaluated.

In FIG. 6, for each of the knife 1 of the present non-limiting embodiment and the conventional metal knife, the number of paper sheets cut at the initial time (1st time), the number of paper sheets cut at the 2nd time, the number of paper sheets cut at the 4th time, the number of paper sheets cut at the 8th time, the number of paper sheets cut at the 16th time and the number of paper sheets cut at the 32nd time are plotted. Also shown in FIG. 6 are the approximate curves for the results for respective knives, where the solid line corresponds to the knife 1 and the dashed line corresponds to the conventional metal knife. In addition, for the conventional metal knife, the number of paper sheets cut at the 64th time is also shown.

From this result, it can be understood that although the conventional metal knife has relatively good initial sharpness, the sharpness does not last long. On the other hand, it can be understood that the knife 1 of the present non-limiting embodiment maintains a relatively high sharpness over many repetitions.

DESCRIPTION OF THE REFERENCE NUMERALS

1: Knife
10: Blade
11: First side face
12: Second side face
13: Back portion
14: Ridge portion
20: Cutting region
21: First cutting face
22: Second cutting face
α: First portion
β: Second portion

What is claimed is:

1. A knife comprising:
a blade having:
   a first portion comprising a first side face, the first side face comprising a first cutting face, and
   a second portion comprising a second side face, the second side face comprising a second cutting face;
wherein
   the blade comprises zirconia as a main component, and has a cutting region, the cutting region comprising:
      at least a ridge portion between the first side face and the second side face,
      the first cutting face in the cutting region, and
      the second cutting face in the cutting region; and
   the first portion comprises columnar crystal grains of the zirconia extending in a direction perpendicular to the first cutting face and the second portion comprises granular crystal grains of the zirconia.

2. The knife according to claim 1, wherein
a proportion of cubic crystals of zirconia in the first side face is greater than a proportion of cubic crystals of zirconia in the second side face.

3. The knife according to claim 1, wherein
the first cutting face has a higher hardness than a hardness of the second cutting face.

4. The knife according to claim 1, wherein
the first side face has a higher hardness than a hardness of the second side face.

* * * * *